Dec. 22, 1970  R. W. HOLMQUIST  3,548,455
APPARATUS FOR DIRECT CONVERSION OF POWDERED MATERIALS INTO PARTS
Filed Aug. 3, 1967  7 Sheets-Sheet 1

INVENTOR.
RICHARD W. HOLMQUIST
BY Merchant & Gould
ATTORNEYS

Dec. 22, 1970     R. W. HOLMQUIST     3,548,455
APPARATUS FOR DIRECT CONVERSION OF POWDERED MATERIALS INTO PARTS
Filed Aug. 5, 1967     7 Sheets-Sheet 3

INVENTOR.
RICHARD W. HOLMQUIST
BY Merchant & Gould
ATTORNEYS

INVENTOR.
RICHARD W. HOLMQUIST
BY Merchant & Gould
ATTORNEYS

INVENTOR.
RICHARD W. HOLMQUIST
BY Merchant & Gould
ATTORNEYS

FIG. 17  FIG. 18  FIG. 20  FIG. 19  FIG. 28

INVENTOR.
RICHARD W. HOLMQUIST
BY Merchant & Gould
ATTORNEYS

INVENTOR.
RICHARD W. HOLMQUIST
BY Merchant & Gould
ATTORNEYS

United States Patent Office 3,548,455
Patented Dec. 22, 1970

3,548,455
APPARATUS FOR DIRECT CONVERSION OF POWDERED MATERIALS INTO PARTS
Richard W. Holmquist, Minneapolis, Minn., assignor to Reuter, Inc., Minneapolis, Minn., a corporation of Minnesota
Filed Aug. 3, 1967, Ser. No. 658,128
Int. Cl. B30b *11/00*
U.S. Cl. 18—16                             10 Claims

ABSTRACT OF THE DISCLOSURE

The apparatus includes a device for preprocessing the powdered material with an electric arc in a hydrogen or other suitable atmosphere. Upper and lower punches slideably mounted in an elongated die to receive accurately metered quantities of the preprocessed powder in an evacuated chamber therebetween are adapted to be forced together by a high velocity projectille to automatically form the powder into parts having desired configurations and preferred metallurgical properties. The upper punch is restrained during the forming process by a relatively large movable mass, which is mounted to move under the force of the high velocity projectile after the part is formed. The restrained movement of the large mass causes the force of the high velocity projectile to be sustained on the part for a time sufficient to liquify and recrystallize the grain boundaries within the part after which it absorbs the unused energy to prevent secondary shock waves in the part. Means are also included for producing a relatively high vacuum in the die prior to insertion of the pre-processed powdered material therein and during the forming of the part.

BACKGROUND OF THE INVENTION

Field of the invention

Powder technology is an ancient art and is the process of forming powdered material into a solid part. Powder technology is presently playing an important role in the search to make equivalent parts cheaper and to obtain properties not obtainable through liquid phase processes.

Description of the prior art

Powder technology as currently practiced generally involves the following three basic steps. First the powder is compacted into approximately the desired shape. Then, the compacted powder is sintered, or heated in a suitable atmosphere to form intergranular bonding. After the part is sintered it is allowed to cool and it is then generally coined or cold worked to the dimensions required. Sintering and coining may be performed on a part several times in special cases in an attempt to obtain dimensional stability. Each of the above steps is performed separately with different machines and may be performed in different places. There are many disadvantages inherent in this prior art powder technology. Among these disadvantages are the fact that separate machines and/or processes must be utilized to perform each step. Further, material combinations are limited. In addition to the above, parts formed, sintered and coined in separate operations do not retain dimensional stability with time and temperature changes, and the density and microstructure are not uniform. Because of the separate steps performed and the apparatus utilized to perform these steps, part designs must often compromise with process limitations.

SUMMARY OF THE INVENTION

This invention relates to apparatus for the direct conversion of powdered materials into parts having a desired configuration and the parts formed thereby, and more specifically, to apparatus wherein preprocessed powdered material is converted to substantially homogeneous parts in a highly evacuated die chamber by striking a portion of the die through a slightly compressible fluid with a high velocity projectile to create a sustained shock impulse on the powdered material and allowing a second portion of the die to move, under a controlled restraint, away from the part after the forming thereof to absorb the unused energy of the high velocity projectile and, thereby, prevent secondary shock waves in the part. Accurately measured portions of the powdered material are quickly heated during preprocessing by an electrical arc to bring the outer boundaries of substantially each grain of powder to a temperature somewhat below the melting point prior to injection into the die. The product formed by the apparatus is novel because the internal portion of each grain remains relatively cool, while the combination of the heat provided during preprocessing the powder and the pressure created by the apparatus causes the boundaries of the various grains of powder to liquefy and fuse with adjacent grain boundaries and subsequently recrystallize, to provide the product with the properties of substantially no internal stresses and/or memory from the forming process.

It is an object of the present invention to provide new and improved apparatus for converting powdered materials into high density parts having preferred metallurgical properties.

It is a further object of the present invention to provide a new and improved apparatus for preprocessing powdered materials.

It is a further object of the present invention to provide apparatus for preprocessing the powder wherein substantially all of the foreign particles and oxides are removed to provide a relatively pure powdered material with the boundaries of each grain of powder heated to a temperature somewhat below the melting point.

It is a further object of the present invention to provide apparatus wherein a high vacuum is produced in the chamber of the die prior to insertion of the powder and during the forming thereof to prevent contamination of the preprocessed powdered material.

It is a further object of the present invention to provide apparatus wherein a portion of a die containing preprocessed powdered material is struck by a high velocity projectile and a second portion is movable under variable restraining forces permitting the unused energy of the high velocity projectile to be absorbed in movement of the second portion, thus preventing destructive secondary shock waves in the part.

It is a further object of the present invention to provide an apparatus for making a product from powdered material wherein the boundaries of each grain of powder are liquefied, fused and recrystallized with boundaries of adjacent grains, while the internal part of each grain remains relatively cool thus providing the product with the properties of substantially no internal stresses and/or memory from the forming process.

It is a further object of this invention to provide apparatus for converting certain powdered materials into products having elongated crystals therein for improved properties.

It is a further object of the present invention to provide a single apparatus for converting powdered material into precision parts having improved homogeneity both in density and microstructure.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIG. 1 is an axial sectional view of the lower portion of the apparatus, some parts shown in elevation;

FIG. 1a is an axial sectional view of the upper portion of the apparatus removed from the lower portion illustrated in FIG. 1, some parts shown in elevation;

FIG. 4 is an enlarged axial sectional view showing the powder preheating device of the apparatus;

FIG. 10 is an enlarged sectional view taken along line 10—10 of FIG. 1a;

FIG. 13 is a view in top plan on a reduced scale as seen from approximately the line 13—13 of FIG. 1a;

FIG. 14 is a sectional view taken along the line 14—14 of FIG. 13;

FIG. 15 is an enlarged sectional view taken along the line 15—15 of FIG. 4, some parts being broken away and shown in section;

FIG. 16 is an enlarged view in top plan as seen from the line 16—16 of FIG. 1a;

DESCRIPTION OF THE PREFERRED EMBODIMENTS

Figures 1, 1A, 13, 14:
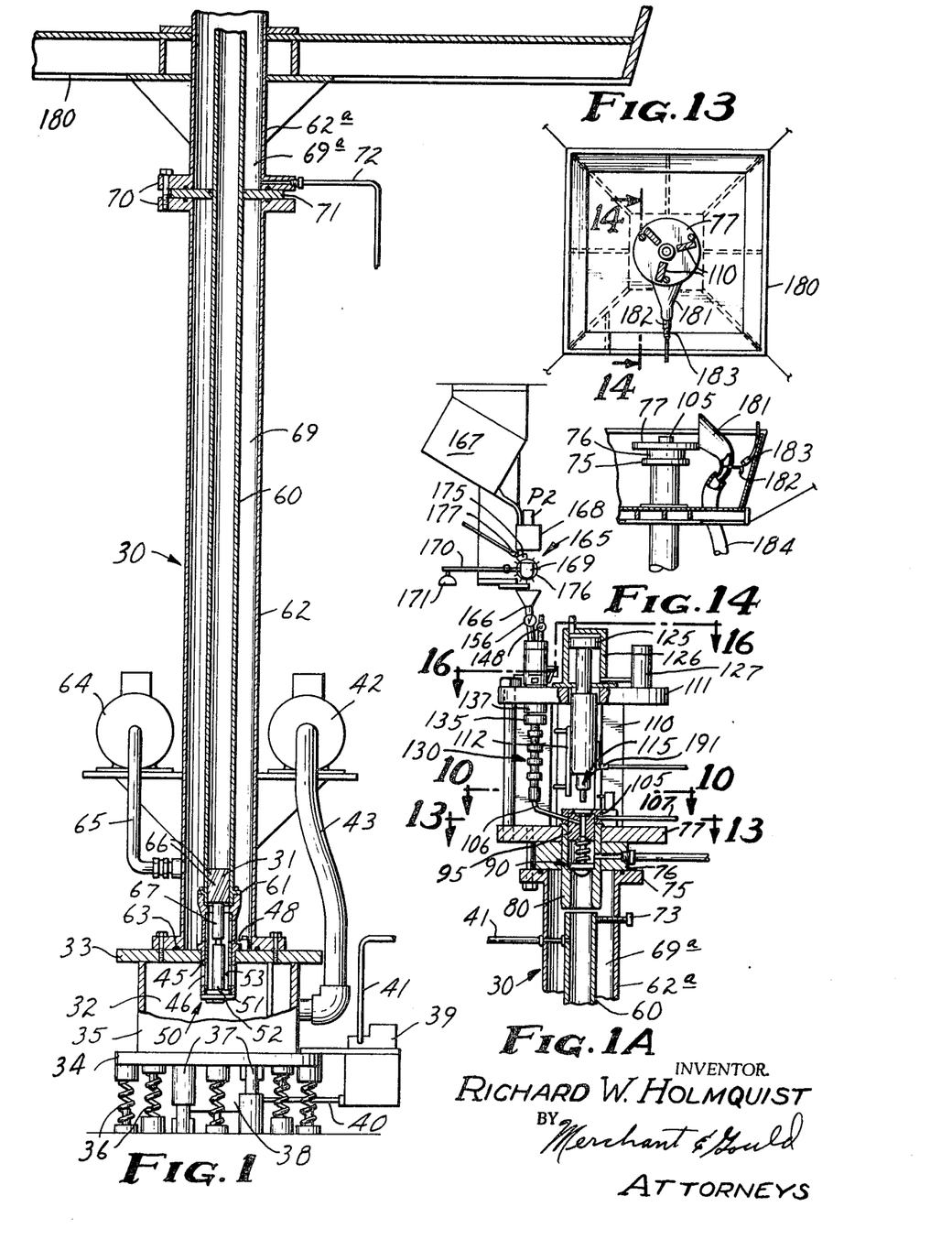
Figures 2, 9:
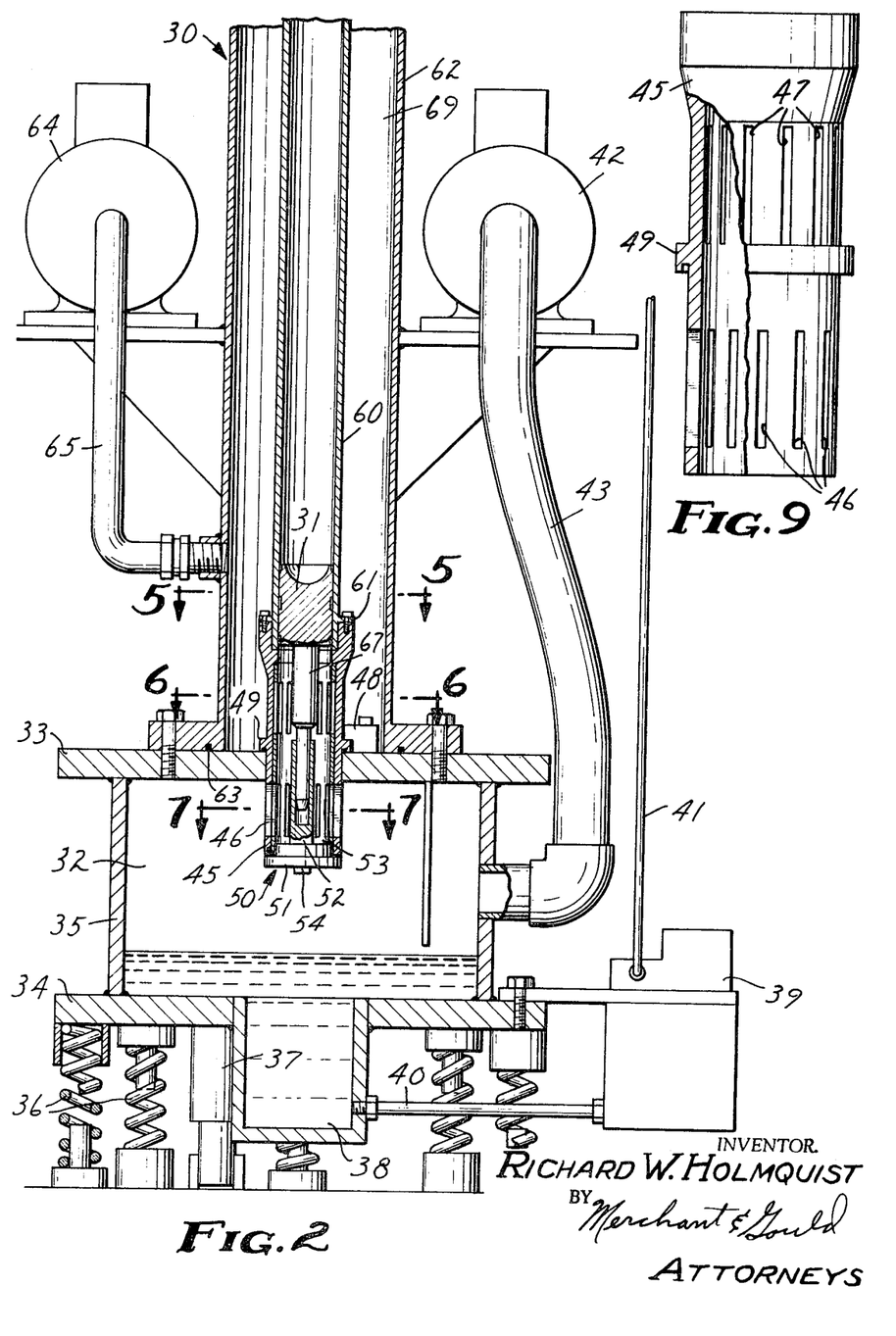
FIG. 2 is an enlarged axial sectional view of the lower portion shown in FIG. 1.
FIG. 9 is a view in side elevation showing the gun valve body, some parts broken away and shown in section.

Referring to FIGS. 1 and 2, a gun generally designated 30 having a projectile 31 slidaeably mounted therein, is illustrated. It should be understood that a variety of apparatus could be utilized to provide the impact required in the part forming process, but the following gun 30 and projectile 31 are utilized in the preferred embodiment for simplicity. A fluid tight chamber 32 is formed by an upper horizontal plate 33, a lower parallel plate 34, and vertical side walls 35. The lower plate 34 is mounted on a plurality of springs 36 and shock absorbers 37 to maintain the chamber 32 spaced from the mounting surface. The lower plate 34 has a central opening therethrough and a reservoir 38 mounted therein for the storing of a suitable fluid, which fluid is used primarily as an energy transfer media and also as a coolant and lubricant. In the preferred embodiment a silicon oil, which has the property of being slightly compressible, is utilized for purposes that will become apparent, but it should be understood that other fluids which will perform the functions required in the present invention might be utilized. A pump 39 attached to the lower plate 34, has an inlet in communication with the reservoir 38 through a conduit 40 and an outlet having a conduit 41 attached thereto. Referring to FIG. 2, oil is illustrated to indicate the approximate level to which the fluid is maintained in the chamber 32 and reservoir 38.

The chamber 32 is in communication with a vacuum pump 42 through a conduit 43. The upper plate 33 of the chamber 32 has a central opening therethrough with a generally cylindrical, hollow elongated gun valve housing 45 positioned therein. The housing 45 is mounted in the upper plate 33 so that a plurality of longitudinally extending slots 46 therethrough are positioned within the chamber 32 and provide communication between the chamber 32 and the inner opening of the housing 45. A second plurality of longitudinally extending slots 47 are formed in the housing 45 and spaced longitudinally from the slots 46 so as to be positioned above the upper plate 33. The housing 45 is fixedly attached to the upper plate 33 by a plurality of L-shaped clamps 48, which are engaged over a shoulder 49 on the outer periphery of the housing 45, and bolts inserted through the clamps 48 and threadedly engaged in the upper plate 33.

A gun valve, generally designated 50, is rotatably mounted with the housing 45 and includes the following items. A disc-shaped plate 51, having an outer diameter approximately the same as the outer diameter of the lower end of the housing 45, has an elongated hollow cylindrical cup 52 fixedly attached approximately centrally, to the upper surface thereof so as to extend upwardly from the plate 51 and a hollow elongated cylinder 53, having a plurality of longitudinally extending slots therethrough corresponding to the slots 46 and 47 attached thereto approximately concentric with the cup 52 and the housing 45. The slots 46 in the housing 45 are off set in a circumferential direction from the slots 47, while the corresponding slots in the cylinder 53 are longitudinally aligned so that the radial alignment of the slots 46 in the housing 45 with the corresponding slots in the cylinder 53 provide an opening from the chamber 32 into the inner opening of the housing 45, but close the slots 47. In a similar manner, radial alignment of the slots 47 with the corresponding slots in the cylinder 53 provide an opening from the inner opening of the housing 45 to the area above the upper plate 33, while the slots 46 are closed by the cylinder 53.

Figures 6, 7:
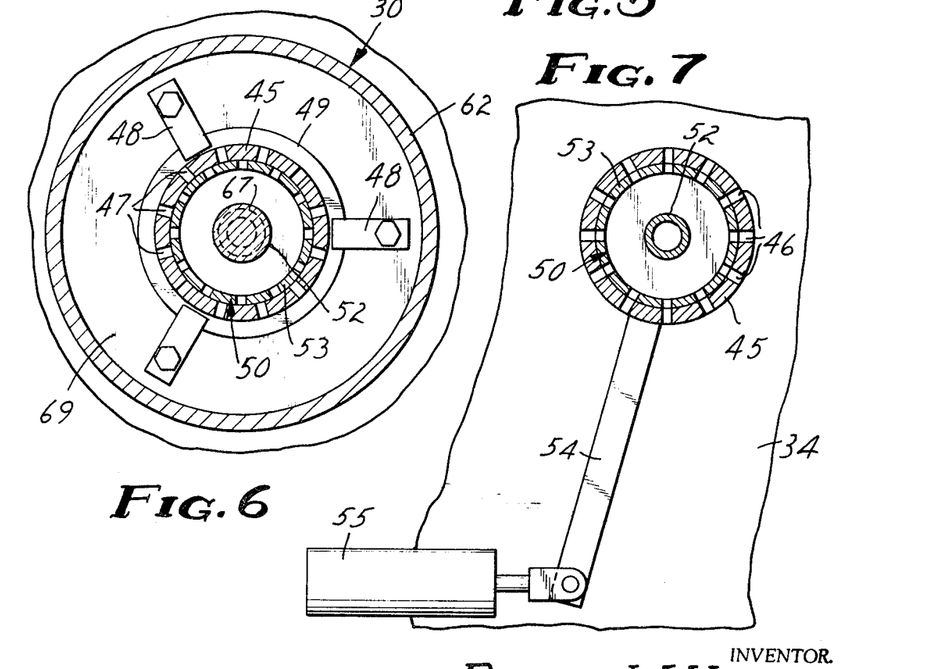
FIG. 6 is an enlarged sectional view taken along the line 6—6 of FIG. 2.
FIG. 7 is an enlarged sectional view taken along the line 7—7 of FIG. 2.
Figures 21, 22, 23, 24, 25, 26, 27:
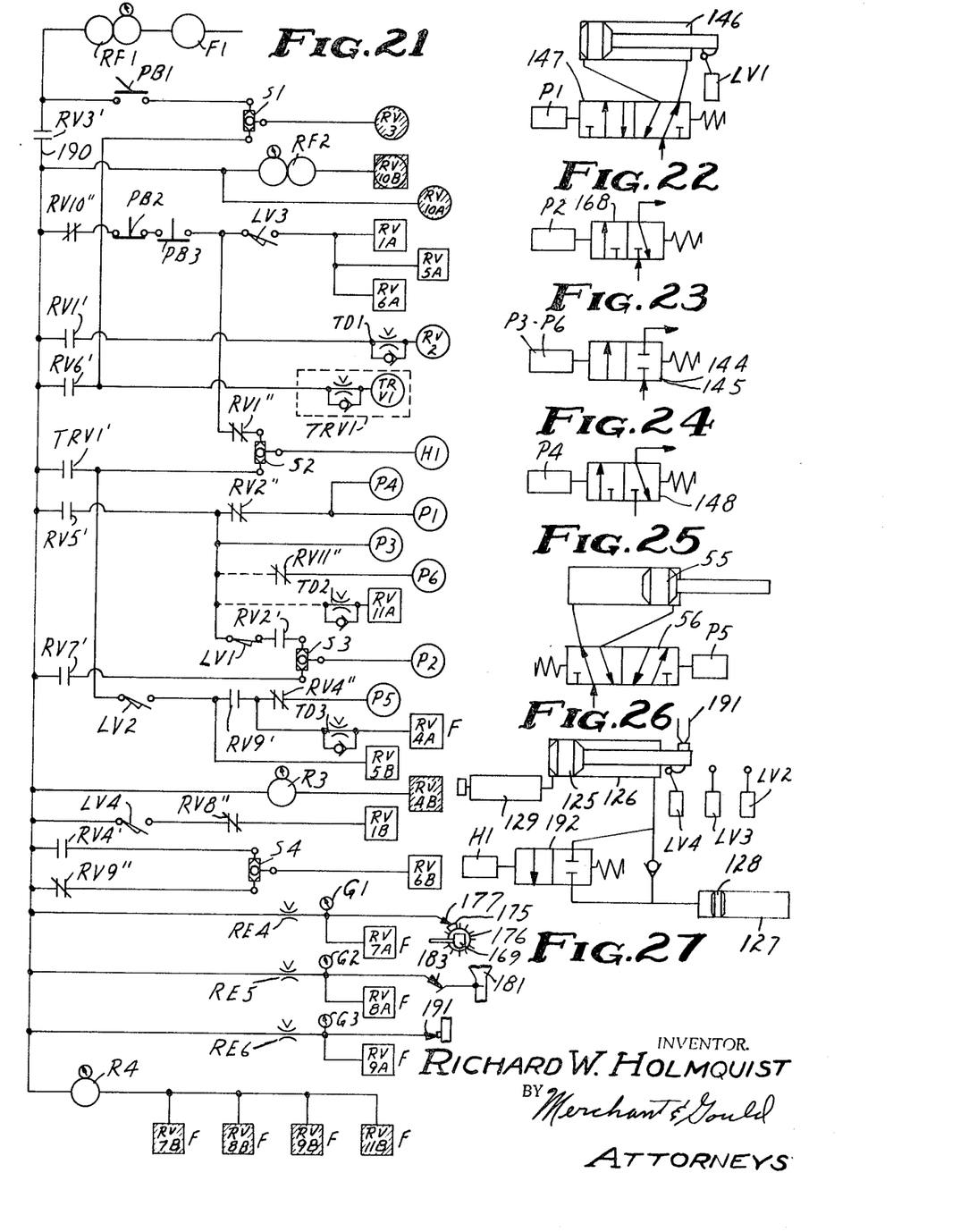
FIG. 21 is a schematic diagram of the fluid circuit.
FIG. 22 is a schematic view of the precharge chamber outlet valve and its connection.
FIG. 23 is a schematic view of the power delivery valve.
FIG. 24 is a schematic view of a valve utilized to deliver hydrogen, a similar one of which is utilized to deliver conducting media.
FIG. 25 is a schematic view of the powder and exhaust slide valve.
FIG. 26 is a schematic view of the gun valve and its connections in the apparatus.
FIG. 27 is a schematic view of the recoil cylinder valve.

The plate 51 is fixedly attached to a radially extending arm 54 (illustrated in FIG. 7), the free end of which is attached to the piston rod of a fluid cylinder 55 operated by fluid controlled through a power valve 56 (illustrated in FIG. 26). The power valve 56 is spring biased to a normal position and is moved to a second position by pressurizing a pilot point P5. The arm 54 is attached so that movement in the fluid cylinder 55 causes pivotal movement of the arm 54 about the longitudinal axis of the gun valve 50 and rotation of the cylinder 53, so that an open passage is provided through the slots 46 and the corresponding slots in the cylinder 53 when the piston is in a first position, and an open passage is provided through the slots 47 and the corresponding slots in the cylinder 53 when the cylinder is in a second position.

An elongated cylindrical gun barrel 60 is positioned within a recess in the upper end of the housing 45, so as to form a smooth continuous cylindrical opening therewith. The gun barrel 60 has a radially outwardly projecting shoulder 61 adjacent the lower end thereof, which butts against the upper surface of the housing 45 and is fixedly engaged therewith by a plurality of bolts or the like. An elongated tubular housing 62, including an upper portion 2a, having an inner diameter substantially larger than the outer diameter of the housing 45, is attached to the upper surface of the upper plate 33 by a plurality of bolts or the like so that it is coaxial with the gun barrel 60 and the housing 45. The junction of the housing 62 with the upper plate 33, has an O-ring 63 therebetween to prevent the leakage of fluid therethrough. A compression pump 64 is in communication with the chamber formed between the housing 62 and the gun barrel 60 through a conduit 65. In the present embodiment, air is utilized as the driving fluid and the compression pump 64 furnishes air under pressure to the housing 62, while the vacuum pump 42 removes air from the chamber 32. Thus, with the piston 55 in the normal or first position, air is removed from the housing 45 through the slots 46, and with the piston 55 in the second position, air under pressure is supplied to the housing 45 through the slots 47.

Figures 5, 8:
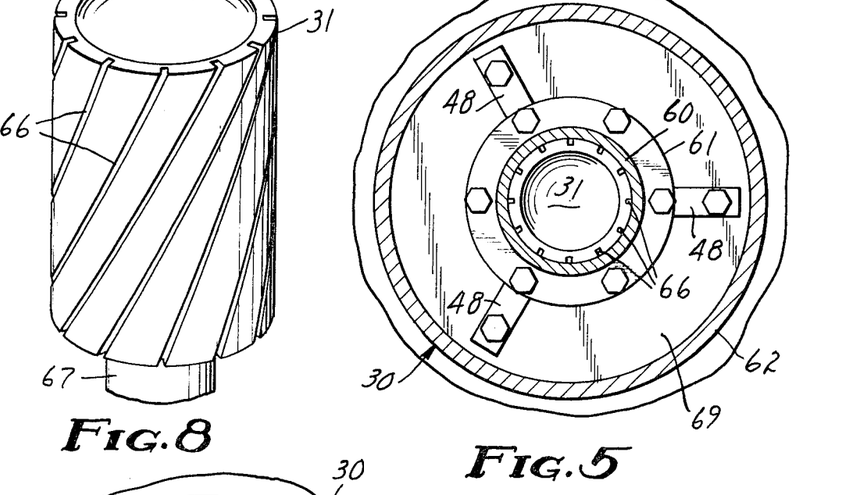
FIG. 5 is an enlarged sectional view taken along the line 5—5 of FIG. 2.
FIG. 8 is a view in perspective showing the ram construction some parts broken away.
Figures 17, 18:
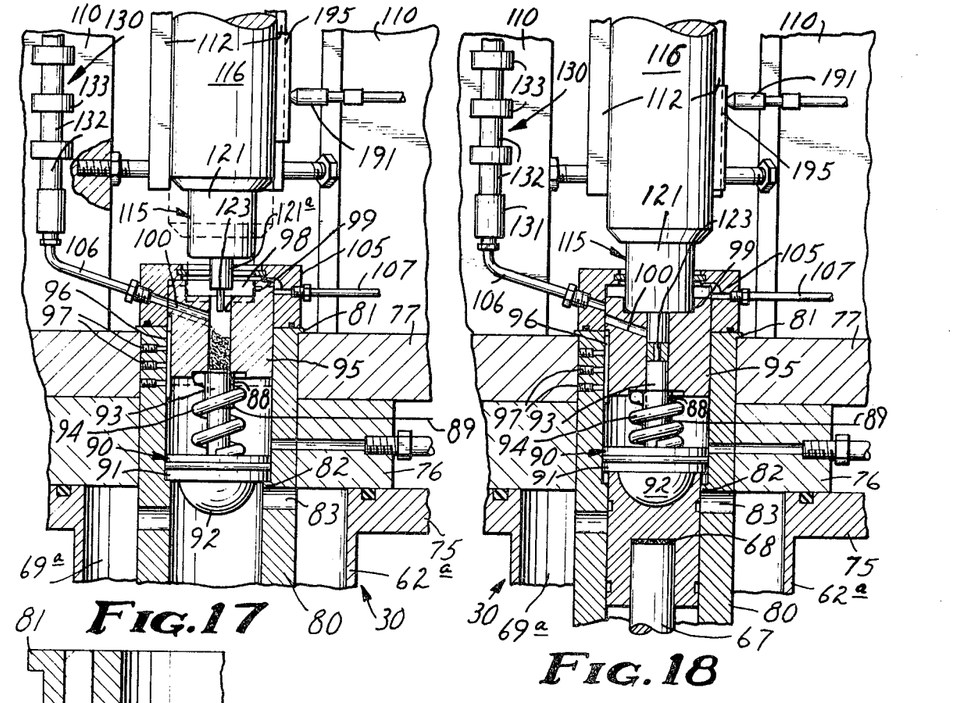
FIG. 17 is an axial sectional view similar to FIG. 3 showing the upper portion of the impact chamber in the dwell position in full lines and the precompression position in dotted lines, some parts broken away.
FIG. 18 is an axial sectional view similar to FIG. 17 showing the impact action, some parts broken away.

The projectile 31, illustrated in detail in FIG. 8, is slideably engaged in the gun barrel 60. The projectile 31 is a generally cylindrical-shaped mass with an outer diameter substantially equal to the inner diameter of the gun barrel 60, having a plurality of spiral-shaped grooves 66 extending inwardly from the outer surface thereof, to provide the projectile 31 with a rotational velocity. An extension 67 of the projectile 31 extends downwardly from the lower end thereof and the lower end of the extension 67 is necked down to fit within the cup 52. The upper end of the conduit 41 connected to the fluid pump 39, is in communication with the gun barrel 60 adjacent the upper end thereof (see FIGS. 1a and 3) and continuously supplies a controlled flow of energy transfer oil to the inner surface of the gun barrel 60. The oil supplied to the gun barrel 60 eventually runs into the housing 45 and fills the cup 52, so that return of the projectile 31 after firing is cushioned by the extension 67 striking the oil within the cup 52. The upper surface of the projectile 31 is concave to form a depression in which the energy transfer oil may gather to cushion the projectile 31 during operation, and to provide the desired shock wave profile, as will be apparent presently. Referring to FIG. 18, it can be seen that the extension 67 is force fit within an opening in the projectile 31, with a small amount of powdered material between the upper end of the extension 67 and the inner end of the opening in the projectile 31 at 68, to minimize the effect of stress raisers during impact.

The tubular housing 62 and the upper portion 62a are formed from a pair of tubular members which are joined together slightly more than midway up the gun barrel 60, to form an extended tube having two separate chambers 69 and 69a therein. The two members have radially outwardly extending flanges 70 at the adjacent ends which are bolted together to maintain them rigidly affixed. A generally disc-shaped metal separator 71 is held rigidly between the flanges 70, and separates the lower or pressurized chamber 69 formed between the tubular housing 62 and the gun barrel 60 from the upper, or surge, chamber 69a formed between the upper portion 62a and the gun barrel 60, to prevent the pressurized air from the compression pump 64 from entering the surge chamber 69a thereabove. An oil drain 72 is in communication with the surge chamber 69a to drain off oil carried over the upper end of the gun barrel 60 by the projectile 31. A plurality of alignment screws 73 are threadedly engaged in the upper portion 62a of the tubular housing 62, and bear against the gun barrel 60 adjacent the upper end thereof to provide radial adjustment, or axial alignment of the gun barrel 60 with the remainder of the apparatus.

Figure 20:
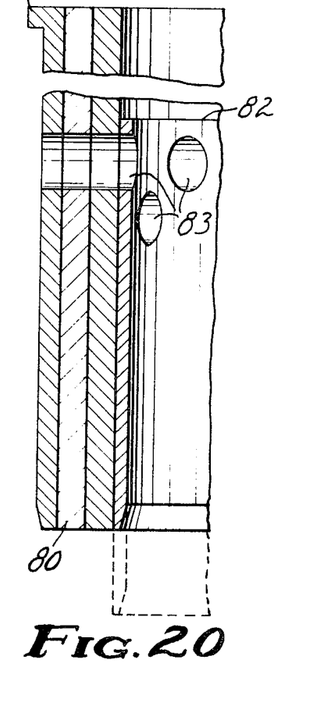
FIG. 20 is an enlarged sectional view illustrating the impact chamber construction, some parts broken away.

The extreme upper end of the upper portion 62a of the tubular housing 62 has a radially outwardly extending flange 75 forming an integral part thereof, and having an annular spacer 76 positioned on the upper surface thereof. The spacer 76 has an annular platform 77 positioned in overlying relationship thereon with the central openings therethrough coaxial with each other, and the gun barrel 60. The spacer 76 and the platform 77 are fixedly attached to the flange 75 by a plurality of bolts or the like. An elongted hollow cylindrical impact chamber 80, having a radially outwardly extending flange 81 adjacent the upper end thereof, is force fit into the openings through the platform 77 and the spacer 76 so that the lower end thereof is spaced a slight distance from the upper end of the gun barrel 60, and the flange 81 is butted against the upper surface of the platform 77. The diameter of the opening through the impact chamber 80 is increased slightly approximately midway therethrough to form a radially outwardly extending step 82 in the surface of the opening. The diameter of the opening through the impact chamber 80 below the step 82, is approximately equal to the inner diameter of the gun barrel 60, while the diameter above the step 82 is increased somewhat. A plurality of openings 83 are formed in communication with the surge chamber 69a in the walls of the impact chamber 80 below the step 82 and at somewhat different positions longitudinally, to relieve the air pressure formed in front of the projectile 31 as it enters the impact chamber 80. This surge chamber 69a has a moderate vacuum prior to operation of the projectile for removing the pressurized air from the front of the projectile 31 during operation thereof. The impact chamber 80 is formed from a plurality of laminations, or concentric hollow cylinders, as illustrated in FIG. 20, to maximize radial strength and to facilitate the replacement of wear surfaces.

A lower punch assembly, generally designated 90, includes a driver 91 having a disc-shaped portion with an outer diameter substantially equal to the inner diameter of the impact chamber 80 above the step 82, and a generally hemispherical protuberance 92, extending downwardly from the lower surface thereof, so that the driver 91 rests on the step 82, and an upwardly projecting die, or punch 93 concentrically mounted in the driver 91. The punch 93 has a cylindrical compression spring 94 positioned approximately concentrically thereover, and the driver 91 has an O-ring or the like positioned between the outer periphery thereof and the inner surface of the impact chamber 80, to form a seal therebetween. The lower punch assembly 90 is adapted to move longitudinally within the impact chamber 80, and normally rests on the step 82.

A generally cylindrical die insert 95 is positioned in the impact chamber 80 above the lower punch assembly 90, so as to extend somewhat above the upper end of the impact chamber 80. The insert 95 is held annularly fixed in place by a key 96, positioned in a key way in the outer surface thereof. The key 96 is held in place by a plurality of screws 97. The die insert 95 has a central opening 98 therethrough transversely aligned with the punch 93, and the die insert 95 is positioned in the impact chamber 80 so that the punch 93 is normally inserted a slight distance into the opening 98. A cylindrical coil 88 having an outer diameter smaller than the inner diameter of the spring 94 and an inner diameter larger than the punch 93 is attached to the lower surface of the die insert 95 coaxial with the punch 93. The coil 88 has an external connection 89 for connecting the coil 88 to a source of energy. The upper surface of the die insert 95 has a counterbore 99 therein.

An opening 100 extends transversely through the die insert 95, at an angle of approximately 15° with the horizontal, from the central opening 98 to the outer surface thereof. The opening 100 is positioned so as to be in communication with an opening through an inverted generally cup-shaped die retainer 105. The die retainer 105 is fixedly connected to the platform 77 by a plurality of L-shaped clamps 108, and associated bolts passing therethrough and threadedly engaged in the platform 77 (see FIG. 12). The opening through the die retainer 105 in communication with the opening 100, is positioned at an angle approximately 15° with the horizontal and has a conduit 106, adapted to receive a charge of powdered material, connected therein. An opening through the die retainer 105 is in communication with a groove in the inner surface thereof and has a conduit 107 connected therein, which conduit 107 is connected to a relatively high vacuum pump (not illustrated). The upper end of the die retainer 105 has an opening therethrough, the diameter of which is somewhat less than the inner diameter of the remainder of the die retainer 105 so that a radially inwardly projecting flange is formed.

Figure 10:
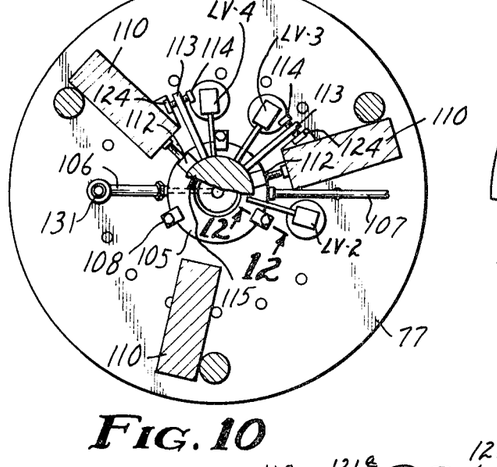
Figure 11:
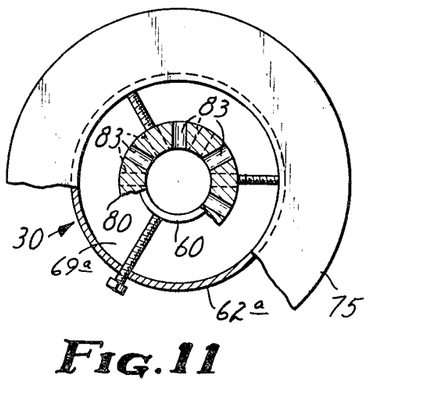
FIG. 11 is a sectional view on a reduced scale taken along the line 11—11 of FIG. 3.

Three generally similar elongated rectangular-shaped spacer plates 110 are affixed in an upwardly extending position with their lower ends abutting the upper surface of the platform 77 so as to radiate outwardly from the die retainer 105 at approximately equally spaced angles, as shown especially in FIG. 10. A second platform 111 is placed in abutting engagement with the upper ends of the spacer plates 110 so as to be parallel and spaced from the platform 77 and the assembly is held fixedly in place by elongated tie rods or the like. Each of the spacer plates 110 has a radially inwardly extending spacer shoe 112 attached thereto by screws threadedly engaged in the spacer plates 110 and adjustable to vary the distance of the spacer shoe 112 from its associated spacer plate 110. The three shoes 112 cooperates to form a channel in which an alignment mass 116 is slideably mounted.

Figures 19, 28:
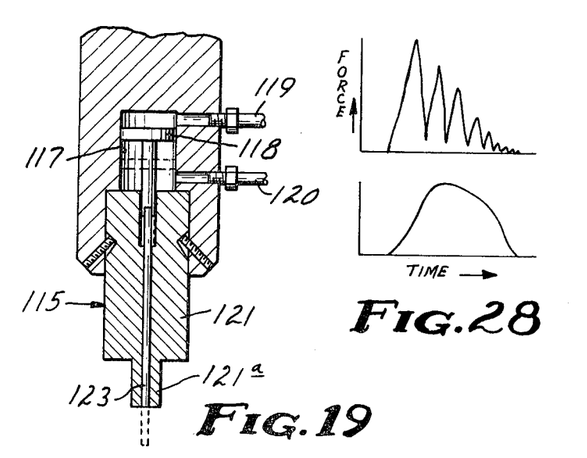
FIG. 19 is an enlarged axial sectional view illustrating the alignment shoe construction.
FIG. 28 is an illustration of the approximate waveforms of the force produced by the impact of a projectile against a solid body and the force produced by the projectile in the present apparatus.

Referring to FIG. 19, the lower end of the alignment mass 116, having an upper punch assembly generally designated 115 engaged therein, is illustrated in detail. The lower end of the mass 116 has a generally cylindrical cavity therein coaxial with the mass 116, the innermost (upper) portion of which has a diameter somewhat smaller than the outer (lower) portion. This innermost portion of the cavity in the mass 116 acts as a cylinder 117 with a piston 118 operatively mounted therein for sliding movement longitudinal of the mass 116. An opening at the innermost end of the cylinder 117 is in communication with an opening through the mass 116 and a conduit 119, while the outermost end of the cylinder 117 has an opening therein in communication with an opening through the mass 116 and a conduit 120. An elongated cylindrical die, or punch 121, having an outer diameter slightly greater than the inner diameter of the cavity in the mass 116, is removably mounted in the cavity with a plurality of set screws 122. The punch 121 has a portion 121a at the lower end thereof coaxial with the mass 116 having a cross sectional configuration, which is approximately similar to the cross sectional configuration of the opening 98 in the die insert 95, and is contained within the diameter of the punch 121.

The adjustments of the alignment shoes 112 are provide to allow radial movement of the mass 116 and, consequently, the punch 121, to provide accurate transverse alignment thereof with the opening 98 in the die insert 95. Referring to FIG. 10, the mass 116 has a pair of linking arms 113 fixedly attached thereto so as to radiate horizontally outwardly adjacent two of the spacer plates 110. Each of the arms 113 has a bolt 114 threadedly engaged in an opening through the arm 113 perpendicular to the longitudinal axis thereof with a nut threaded on the end thereof and slideably engaged in a vertical groove 124 on the adjacent spacer plate 110 so as to allow free vertical movement of the nut but substantially no horizontal movement. Thus, by adjusting the bolts 114, the upper punch assembly 115 can be rotated slightly about its axis to correctly position the punch 121 relative to the die insert 95 and punch 93. The punch 121 has an axial opening the entire length thereof, and a rod 123 is positioned therein having its upper end attached to the piston 118. The rod 123 is provided to form a hole through the product when the rod 123 is in its lowered position, illustrated in FIG. 3 and in dotted lines in FIG. 19. In other product configurations the rod 123 may be eliminated and one or more ejection pins (not shown) may be activated by the piston 118 to disengage the product from the punch portion 121a. The conduits 119 and 120 are flexible so that they will move with the upper punch assembly 115.

Figures 4, 15, 16:
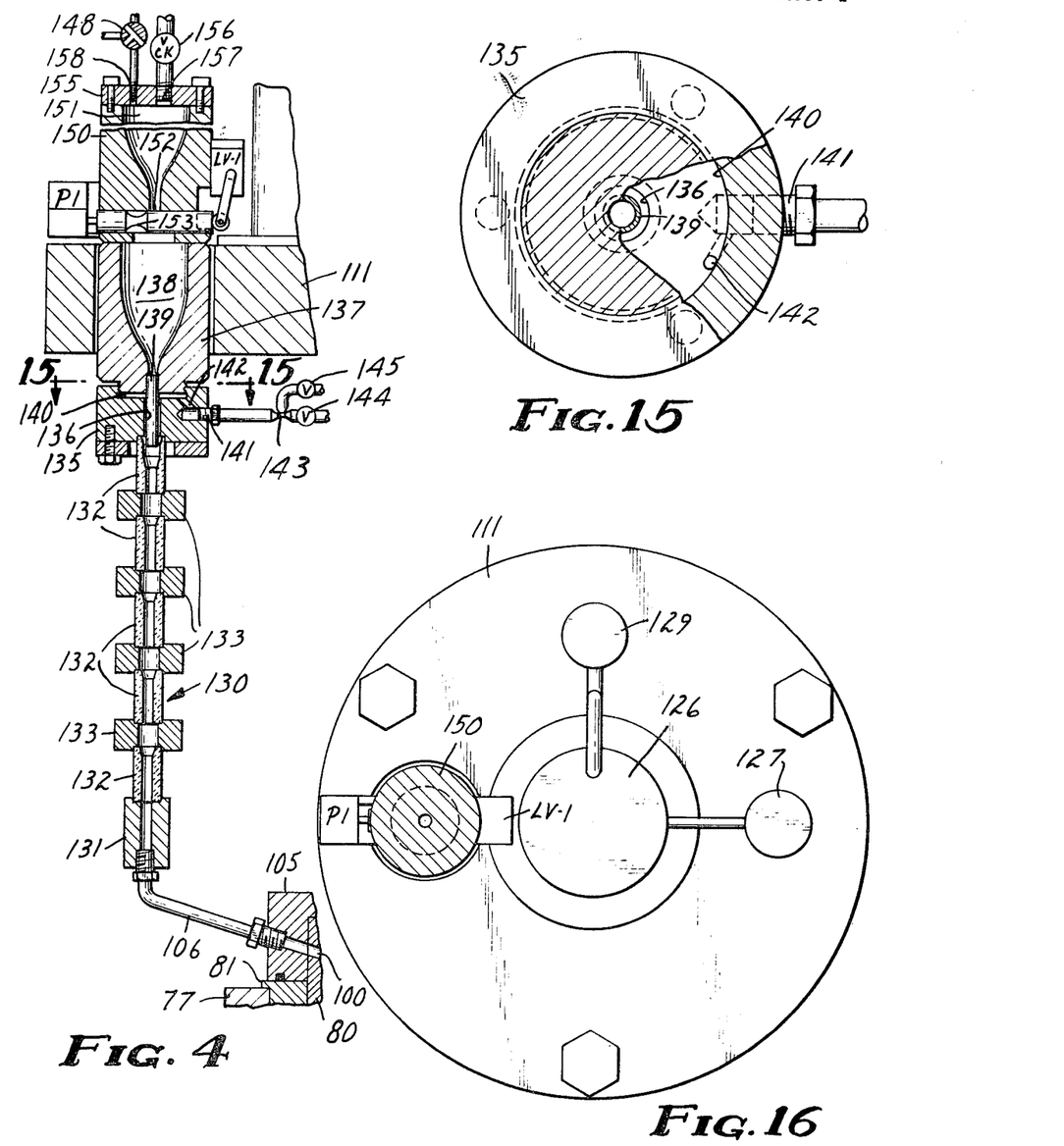

The second platform 111 has a centrally located opening therethrough with an inner diameter slightly larger that the outer diameter of the mass 116 for receiving the upper end thereof as it moves upwardly. The lower end of a connecting rod for a piston 125 is attached to the upper end of the mass 116 for movement therewith, and a cylinder 126 in which the piston 125 is slideably engaged, is mounted coaxially over the opening in the second platform 111. The lower end of the cylinder 126 adjacent the upper surface of the second platform 111, has an opening therethrough and a conduit in communication with an accumulator 127. The accumulator 127 is illustrated schematically in FIG. 27, where it can be seen that a free piston 128 is mounted therein. In FIG. 27 the accumulator 127 has nitrogen gas to the right of the free piston 128 and oil to the left thereof. The upper end of the cylinder 126 has an opening therein and a conduit attached in communication with a second accumulator 129 (illustrated in FIG. 16 and schematically in FIG. 27) which contains nitrogen gas. The piston 125 in the cylinder 126 and the accumulators 127 and 129 operate on the alignment mass 116 to restrain the movement thereof, as will be described in detail presently.

A powder preprocessing device, generally designated 130, is attached to the conduit 106 to supply preprocessed powder to the opening 98 in the die insert 95 at certain prescribed intervals. The upper end of the conduit 106 is connected to the lower end of an opening through a generally cylindrical adaptor 131. One end of a hollow cylindrical ceramic insulator 132 is press fit into a depression in the upper end of the adaptor 131 so that the opening therethrough is in coaxial alignment with the opening through the adaptor 131. The upper end of the ceramic insulator 132 is press fit into a depression in the lower surface of a hollow cylindrical electrode 133, so that the opening through the electrode 133 is in coaxial alignment with the opening in the ceramic insulator 132. In the present embodiment, four more ceramic insulators 132 and three more electrodes 133 are alternately press fit together to provide an elongated opening through which the powdered material may be conveyed to provide it with a required amount of heat. It should be understood that various numbers and configurations of electrodes and ceramic insulators might be utilized to provide a desired amount of heating in the preprocessing of various powders, and all such variations would be well within the scope of this invention. Each of the electrodes 133 is connected to a source of voltage (not shown) so that arcs are produced between adjacent electrodes 133 to heat any material passing therebetween.

The upper end of the topmost ceramic insulator 132 is press fit into a depression in the bottom of a venturi adaptor 135. The venturi adaptor 135 has a central opening 136 therethrough, which is in coaxial alignment with the opening through the ceramic insulators 132 and the electrodes 133, and is threadedly engaged onto the bottom of a powder receiver 137, having a generally funnel-shaped opening 138 therethrough, the lower end of which is in coaxial alignment with the opening 136 through the adaptor 135. A tubular member 139 having an outer diameter somewhat smaller than the diameter of the opening 136, is press fit into the opening in the lower end of the powder receiver 137 and extends substantially through the venturi adaptor 135 so that powder leaving the powder receiver 137 through the tubular member 139, is conducted directly to the first ceramic insulator 132.

When the powder receiver 137 and the venturi adaptor 135 are threadedly engaged together, a generally flat disc-shaped chamber 140 is formed therebetween. The chamber 140 is in communication with the opening 136 through the venturi adaptor 135, and with a fluid opening 141 through the side of the venturi adaptor by means of a generally tangentially positioned passage 142. In the present embodiment, the fluid opening 141 is connected to a source of hydrogen through a venturi tube 143 and a spring biased power valve 144 operated by pressurizing a pilot point P3, but it should be understood that in some instances fluids other than hydrogen gas might be utilized. The venturi tube 143 is connected to a second source of fluid through a spring biased power valve 145, operated by pressurizing a pilot point P6, for purposes that will be explained presently. Thus, when hydrogen gas is applied through the valve 144, the hydrogen enters the chamber 140 tangentially, and spirals downwardly through the opening 136 in the venturi adaptor 135 into the first ceramic insulator 132. The downwardly spiralling hydrogen gas mixes with powders leaving the tubular members 139, and carries the powders through the ceramic insulators 132 and the electrodes 133 to the conduit 106. In the process, because of the intense heat of the arcs, the boundaries of the grains of powder are heated to a temperature somewhat below the melting point, and the hydrogen reduces any oxides and removes many other impurities to provide a relatively clean preprocessed powder at the conduit 106.

The powder receiver 137 is fixedly mounted in an opening in the second platform 111 with a precharge chamber 150, having a funnel-shaped opening 151 therethrough, mounted in abutting engagement with the upper surface thereof so that the opening 151 is approximately coaxial with the opening 138. A horizontal hole through the precharge chamber 150 adjacent the lower end thereof perpendicular to and intersecting the axis of the opening 151, has a powder dump plunger 152 mounted therein for longitudinal sliding movements. The plunger 152 is substantially the same diameter as the hole, but has a necked down portion 153 which, when aligned with the opening 151 in the precharge chamber 150, allows powder to flow therefrom into the powder receiver 137. Longitudinal movement of the plunger 152 to align the necked down portion 153 with the opening 151 and open the valve or misalign the necked down portion 153 and close the valve, is accomplished by a piston and cylinder assembly 146 operated by fluid controlled through a power valve 147 (illustrated in FIG. 22). Valve 147 is spring biased to a normal position and is operated to a second position by pressurizing a pilot point P1. As the plunger 152 moves longitudinally, the actuating arm of a switch LV1 is engaged so that the switch LV1 is operated each time the necked down portion 153 is aligned with the opening 151.

The upper end of the opening 151 in the precharge chamber 150, is sealed by a cover 155 attached in overlying relationship by bolts or the like. The cover 155 has a powder passageway 157 and a gas passageway 158 extending vertically therethrough. The powder passageway 157 has a check valve 156 therein to allow powder to enter the precharge chamber 150 but to prevent the escape thereof in a reverse direction. The gas passageway has a spring biased valve 148 (shown schematically in FIG. 25) therein, which has a source of pressurized nitrogen gas (not shown) connected to one inlet and an outlet vented to atmosphere. In the normal position, the valve 148 allows nitrogen to escape from the precharge chamber 150 as powder enters through the passageway 157. When a pilot point P4 is presurized the valve 148 operates to connect the source of pressurized nitrogen gas to the passageway 158 and force the powder out of the precharge chamber 150 into the powder receiver 137.

A powder measuring device, generally designated 165 (illustrated in FIG. 1a), periodically delivers a measured charge of powder through a conduit 166 to the powder passageway 157 in the precharge chamber 150. While the powder measuring device 165 is illustrated attached to the main apparatus, it should be understood that it might be positioned at some distance from the apparatus and the measured charges of powder could be transported by some convenient means, such as nitrogen gas flowing through conduit. The powder measuring device 165 includes a source of powder 167, illustrated as a cylindrical container having a spout engaged in an opening of a spring biased power valve 168, operated by pressurizing a pilot point P2. Through the valve 168, a relatively constant flow of powder from the source 167 is directed into a cup 169. The cup 169 is mounted at one end of a lever arm 170 having a weight 171 mounted at the other end thereof, and pivoted so that the cup 169 remains in the normal, or powder receiving, position until a desired amount of powder is collected therein. As the desired amount or charge of powder is collected in the cup 169, the lever arm 179 begins to pivot and a closure member 175 on a vaned wheel 176 moves away from the end of a jet 177 attached to a source of pressurized air. As the closure member 175 unblocks the jet 177, the stream of air strikes the vanes of the wheel 176 causing additional rotation of the lever arm 170 and the cup 169 is emptied into a flanged end of the conduit 166. When the jet 177 is unblocked the valve 168 operates to stop the flow of powder into the cup 169 by circuitry which will be explained presently. Once the cup 169 is empty, the weight 171 pivots the lever arm 170 back to its normal position and the closure member 175 again blocks the jet 177. The entire powder measuring device 165 is then ready to measure the next charge.

A service platform 180 is attached to the housing 62a below the part forming impact chamber 80 to provide a station for an operator to service and control the machine. The platform 77 has a funnel-like chute 181 mounted thereon, about the service platform 180, so as to receive the finished parts as they are removed from the die insert 95, and direct them through a conduit 184 passing through the service platform 180. As the parts pass through the chute 181, a lever 182 is tripped unblocking a jet 183, which is attached to a source of pressurized air. When the jet 183 is unblocked by a part passing through the chute 181, an indication is supplied to the logic apparatus, as will be described in conjunction with FIG. 21, indicating that the part has been removed from the apparatus and the apparatus is ready to recycle.

In the schematic illustrations, FIGS. 21 through 27, the various parts previously described have corresponding numbers thereon and the schematic symbols utilized are those well recognized by one skilled in the art. The various single squares and circles in FIG. 21 identify pilot points into which pressurized air is introduced to shift the valves from the illustrated conditions. If a valve or relay has only one pilot point, the symbol carries only the number of the valve or relay. If a valve or relay has two pilot points, each carries the number of the valve or relay and in addition it carries an "A" or a "B." In this embodiment all flow paths are illustrated in the normal position and pressurizing the associated pilot point carrying the letter "A" will cause the flow path to shift to the other position. Each relay flow path (illustrated as a pair of contacts) is designated with the number of the relay and in addition carries a prime for a normally open path and a double prime for a normally closed path. Pilot points indicated with a circle and the relay number therein, designate spring return or automatic return to the normal or illustrated position after the signal is removed from the pilot point. Pilot points indicated by a square, designate relays which remain shifted after the signal is removed therefrom and require a specific amount of pressure to shift back to the opposite position. Pilot points designated by a square followed by an "F" indicate a free acting relay which requires only an unbalanced pressure at the opposite pilot points to operate. All pilot points which are pressurized at the start of the normal automatic cycle are cross hatched. All connections between the pilot points and the relays and other components are made with conduit carrying pressurized air in this embodiment, but it should be understood that many other types of fluid might be utilized. It should also be understood that variations of the present circuitry might be utilized, and other types of circuitry, such as electric, electronic, etc., might be employed by those skilled in the art.

Referring to FIG. 21, the inlet of a primary filter F1 is connected to a suitable source of pressurized air, and the outlet is connected to a regulator-filter unit RF1. The outlet of the regulator-filter unit RF1 is connected to an inlet of a push-button valve PB1 and to an inlet of a relay flow path RV3'. The outlet of the push-button valve PB1 is connected to an inlet of a shuttle S1, the outlet of which is connected to a pilot point RV3. A main air line 190 is connected to the outlet of the relay flow path RV3 and to an inlet of the following components: a regulator-filter RF2; a pilot point RV10A; normally closed relay flow paths RV10" and RV9"; normally open relay flow paths RV1', RV6', TRV1', RV5', RV7' and RV4'; a limit valve LV4; regulators R3 and R4; restricting valves RE4, RE5, and RE6. The outlet of the regulator-filter RF2 is connected to a pilot point RV10B. The outlet of the relay flow path RV10" is connected to three pilot points RV1A, RV5A, and RV6A through a series connection of a push-button switch PB2, a second push-button switch PB3, and a limit valve LV3. The outlet of the relay flow path RV1' is connected to an inlet of a time delay TD1, the outlet of which is connected to a pilot point RV2. The outlet of the relay flow path RV6' is connected to the inlet of a time delay relay TRV1 and to an inlet of the shuttle S1. The junction of the push-button switch PB3 and the limit valve LV3 is connected to an inlet of a normally closed relay flow path RV1", the outlet of which is connected to an inlet of a shuttle S2. The outlet of the relay flow path TRV1' is connected to a second inlet of the shuttle S2, the outlet of which is connected to a pilot point H1. The inlet of the relay flow path TRV1' is also connected to an inlet of a limit valve LV2, the outlet of which is connected to a normally open relay flow path RV9' and to a pilot point RV5B. The outlet of the relay flow path RV9' is connected to an inlet of a normally closed relay flow path RV4" and to an inlet of a time delay TD3. The outlet of the relay flow path RV4" is connected to a pilot point P5 and the outlet of the time delay TD3 is connected to a free acting relay valve RV4A. The outlet of the relay flow path RV5' is connected to an inlet of a normally closed relay flow path RV2", a pilot point P3, an inlet of a relay flow path RV11" (under circumstances which will be described presently), an inlet of a time delay TD2 (under circumstances which will be described presently) and a limit valve LV1. The outlet of the relay flow path RV2" is connected to a pilot point P1 and a pilot point P4. The outlet of the relay flow path RV11" is connected to a pilot point P6. The outlet of the time delay TD2 is connected to a pilot point RV11A. The outlet of the limit valve LV1 is connected to an inlet of the relay flow path RV2', the outlet of which is connected to an inlet of a shuttle S3.

The outlet of the relay flow valve RV7" is connected to a second inlet of a shuttle S3 and the outlet thereof is connected to a pilot point P2. The outlet of the regulator R3 is connected to a pilot point RV4B. The outlet of the limit valve LV4 is connected to an inlet of a relay flow path RV8", the outlet of which is connected to a pilot point RV1B. One inlet of a shuttle S4 is connected to the outlet of the relay flow path RV4', a second inlet of the shuttle S4 is connected to the outlet of the relay flow path RV9" and the outlet thereof is connected to a pilot point RV6B. The outlet of the restricting valve RE4 is connected to a gage G1, the jet 177 and a pilot point for a free acting relay valve RV7A. The outlet of the restricting valve RE5 is connected to a gage G2, the jet 183 and a pilot point for a free acting relay valve RV8A. The outlet of the restricting valve RE6 is connected to a gage G3, a jet 191 and a pilot point of a free acting relay valve RV9A. The outlet of the regulator R4 is connected to pilot points RV7B, RV8B, RV9B, and RV11B for the free acting relay valves associated therewith.

OPERATION

Push-button switches PB1, PB2, and PB3, are of the type that remain in the position in which they are placed. The push-button switch PB1 is normally located near the supply of air, the push-button switch PB2 is located at a remote position such as platform 180 and is normally maintained in the start or closed position, and the push-button switch PB3 is the main control button, which starts the operation upon the closure thereof. The push-button switch PB1 is normally maintained closed so that air is supplied through the shuttle S1 to the pilot point RV3, which maintains the relay flow path RV3 closed, and supplies air to the main air line 190. A path is supplied for air from the main air line 190 through the relay flow path RV6' to the other inlet of the shuttle S1 and then to the pilot point RV3 in the event air pressure is removed from the first inlet of S1, so that a cycle which has already been started will be completed even though the push-button switch PB1 is inadvertently opened. The circuitry including the regulator-filter RF2 and the two pilot points RV10B and RV10A, are supplied to shut off the apparatus in the event the pressure of the air supply drops below a predetermined value. The relay valve RV10 operates in a manner such that the pilot point RV10B must have a predetermined air pressure thereon to maintain the relay flow path RV10" closed. When the pressure drops below the predetermined value, the pilot point RV10A takes over and opens the relay flow path RV10".

The limit valves LV2, LV3, LV4, are mounted on the platform 77 (see FIGS. 1a and 10) so that they engage the mass 116 and operate at predetermined positions of the mass 116 (see FIG. 27). When the upper punch assembly 115 is in the position illustrated in FIGS. 1a and 3, the limit valve LV4 is engaged or closed and the apparatus is in the "eject" position. When the upper punch assembly 115 is in the position illustrated in FIG. 17, the limit valve LV3 is engaged or closed, and the apparatus is in the "dwell" position. When the upper punch assembly 115 is in the position illustrated in FIG. 18, the limit valve LV2 is engaged or closed and the apparatus is in the "pre-compression" position.

With the push-button switches PB1 and PB2 closed, the apparatus is started by closing the main push-button switch PB3 to complete a path from the main air line 190 through the relay flow path RV10", push-button switches PB2 and PB3, relay flow path RV1", and shuttle S2 to the pilot point H1. Referring to FIG. 27, it can be seen that energizing the pilot point H1 operates an associated power valve 192 from the normal position illustrated to a position in which a path is provided for oil to flow from the cylinder 126 through the power valve 192 to the accumulator 127. As oil flows out of the cylinder 126, the piston 125 moves out of engagement with the limit valve LV4 and into engagement with the limit valve LV3. When the limit valve LV3 is engaged and closed, a path is completed from the main push-button valve PB3 to the pilot points RV1A, RV5A, and RV6A. When pressure is supplied to the pilot point RV1A, the normally closed relay flow path RV1" opens and removes pressure from the pilot point H1, thereby, stopping the piston 125 in engagement with the limit valve LV3.

Simultaneous with the closing of the relay flow path RV3' and pressurization of the main air line 190, the pilot points RV7B, RV8B, RV9B, and RV10B are pressurized through the regulator RV4 and the pilot point RV4B is pressurized through the regulator R3. Also, the pilot points RV7A, RV8A and RV9A are pressurized through the restricting valves RE4, RE5, and RE6. Because of the regulator R4, the pressure on the pilot points RV7B, RV8B and RV9B is less than the pressure on the pilot points RV7A, RV8A and RV9A, when the jets 177, 183 and 191 are blocked. However, when any of the jets 177, 183, or 191 is unblocked the pressure on the pilot point associated therewith is greatly decreased, because of the restricting valves RE4, RE5, or RE6 and the pilot points RV7B, RV8B or RV9B take over to return the associated relay flow paths to the normal position (illustrated).

With the pressurization of the pilot point RV1A, the pilot points RV5A and RV6A are also pressurized. Pressurizing the pilot point RV5A closes the relay flow path RV5' and provides a pressure on the pilot point P3 and on the pilot points P4 and P1 through the normally closed relay flow path RV2". Pressurizing the pilot point P1 causes the air cylinder and piston assembly 146 (illustrated in FIG. 22) to operate the powder dump plunger 150 (illustrated in FIG. 4) and allow the charge of powder to flow from the precharged chamber 150 into the powder receiver 137. Pressurizing the pilot point P4 operates the power valve 148 to the position which allows pressurized nitrogen gas, or the like, to enter the precharged chamber 150 through the opening 158 and force the powder into the powder receiver 137. Pressurizing the pilot point P3 allows hydrogen to flow through the opening 141 into the chamber 140 and carry the powder through the electrodes 133 to be preprocessed, as previously described. Since the upper punch assembly 115 is held in the position illustrated in FIG. 17, the preprocessed powder flows from the powder preprocessing device 130 into the opening 98 in the die insert 95. In the dwell position (illustrated in FIG. 17) the opening 98 is substantially evacuated by the high vacuum in the conduit 107.

When the relay flow path RV1" opens the relay flow path RV1, closes, supplying pressure to the input of the time delay TD1. Simultaneously the pressure supplied to the pilot point RV6A closes the relay flow path RV6', supplying pressure therethrough to the input of the time delay relay valve TRV1. The time delay TDD1 and the time delay relay valve TRV1 are commercially available components which can be set to delay the flow of pressurization fluid therethrough for substantially any desired amount of time. The time delay TD1 is set to provide sufficient time for powder to pass from the precharge chamber 150 into the powder receiver 137, at which time the pilot point RV2 is pressurized and the relay flow path RV2" opens while the relay flow path RV2' closes. Opening the relay flow path RV2" depressurizes the pilot points P1 and P4 so that the power valve 148 is returned to the normal position and the powder dump plunger 152 moves back to the normal position, whereupon, limit valve LV1 closes.

Thus, a path is completed from the main air line 190 through the relay flow path RV5', limit valve LV1, relay flow path RV2' and shuttle S3 to the pilot point P2. When the pilot point P2 is pressurized, the valve 168 in the powder measuring device 165 is opened and powder is allowed to flow from the source 167 to the cup 169 whereupon, a second charge of powder is measured and supplied to the conduit 166. When the apparatus is activated and pressurized air is supplied to the main aid line 190, pressurized air is immediately supplied through the restricting valve RE4 to the jet 177. When the jet 177 is closed by closure member 175, the pressure of the air on the pilot point RV7A is sufficient to overcome the pressure on the pilot point RV7B and the relay flow path RV7 is closed providing a second circuit to the pilot point P2. This circuit maintains the pilot point P2 pressurized until the cup 169 is sufficiently filled with powder to move the wheel 176 down and unblock the jet 177. When this occurs, pressure is greatly reduced at the pilot point RV7A and the pilot point RV7B takes over to open the relay flow path RV7' and depressurize the pilot point P2, stopping the flow of powder into the cup 169.

After a sufficient length of time has passed for the entire charge of powder to be preprocessed and enter the opening 98, the time delay relay valve TRV1 operates closing the relay flow path TRV1' and supplying pressure to the pilot point H1, which allows the piston 125, the mass 116, and the upper punch assembly 115 to move into the precompression position (illustrated in FIG. 18). As the upper punch assembly 115 moves into the procompression position, the mass 116 causes the limit valve LV2 to close which supplies pressure to the pilot point P5 through the closed relay flow paths RV9' and RV4". Closure of the limit valve LV2 also supplies pressure to the inlet of the time delay TD3 and to the pilot point RV5B.

Pressurizing the pilot point P5 moves the arm 54 (see FIG. 7) which rotates the gun valve 50 to supply compressed air from the compression pump 64 and the housing 62 through the slots 47 in the gun valve housing 45. The sudden change of pressure in the gun valve housing 45 from a substantial vacuum to a high pressure causes the projectile 31 to move rapidly up the gun barrel 60 and strike the lower punch assembly 90. The energy transfer oil filling the depression in the upper end of the projectile 31 cushions the shocks of the projectile 31 striking the lower punch assembly 90 and provides a force profile as illustrated, approximately, by the first portion of the lower curve in FIG. 28. (The upper curve illustrates an approximate force profile for a projectile impacting directly on a solid object.) The sudden impacting force on the lower punch assembly 90 causes the punch 93 in conjunction with the die insert 95 and the punch 121 to convert the preprocessed charge of power into the desired shape. During this conversion, the combination of the heat provided during preprocessing the powder and the pressure cause the boundaries of the various grains of powder in the charge to liquefy, fuse, and subsequently recrystallize with adjacent boundaries.

At some time prior to and during impact of the projectile 31 on the lower punch assembly 90, the coil 88 may be energized, through the internal connection 89, to create a magnetic field through the powdered material in opening 98 of the die insert 95. It is believed that this magnetic field causes alignment of molecules and subsequently provides elongated crystals in certain materials which improves the properties of the manufactured part. While a single coil 88 is illustrated in conjunction with the die insert 95, it should be understood that a second coil might be included in the upper punch assembly 115 instead of, or in addition to, the coil 88.

Figures 3, 12:
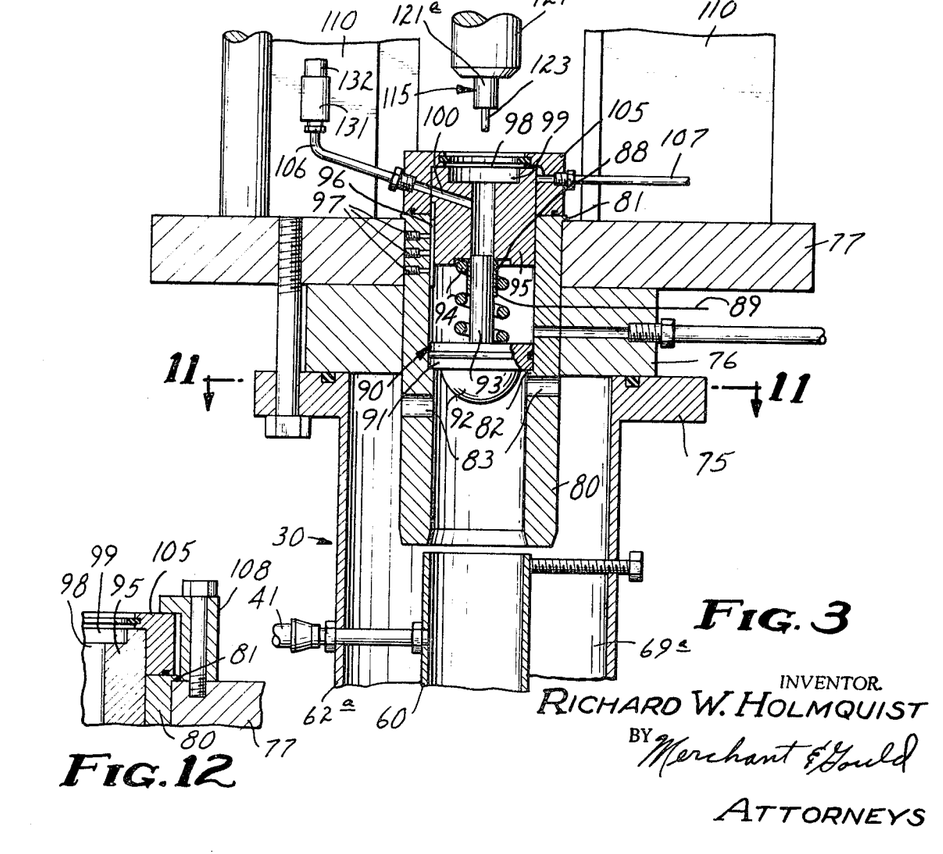
FIG. 3 is an enlarged axial sectional view showing the impact chamber of the apparatus.
FIG. 12 is an enlarged sectional view taken along the line 12—12 of FIG. 10.

As the force of the sudden impact of the projectile 31 with the lower punch assembly 90 carries through the charge of powder, it is transmitted to the upper punch assembly 115 which begins to move toward the eject position (illustrated in FIG. 3). The combination of the mass 116 and the nitrogen gas in the accumulator 129, provides sufficient pressure on the upper punch assembly 115 to absorb the entire unused energy of the projectile 31 by the time the upper punch assembly 115 has moved into the eject position. Because the upper punch assembly 115 presents a movable surface against which the lower punch assembly 90 is forced, the pressure applied to the charge of powder by the impact of the projectile 31 is held for a short period of time (as illustrated by the relatively flat central portion of the lower curve in FIG. 28) rather than being instantaneous. Also, since the unused energy of the projectile 31 is absorbed by the upper punch assembly 115, there is no reverberation or secondary shocks in the formed part, and the force is retarded gradually as illustrated, approximately, at the rear portion of the lower curve in FIG. 28.

As the upper punch assembly 115 moves into the eject position, the formed part is carried with the punch 121 from the opening 98 either with the rod 123 or because of retention of the upper surface of the product with the upper punch 121. Pressure is supplied to the conduit 120 (or 119) through a valve (not shown) which is actuated by the movement of the mass 116 to move the piston 118 and the rod 123 (or ejection pins not shown) so that the part is removed therefrom. The part then enters the chute 181 and unblocks the jet 183. Since the upper punch assembly has moved into the eject position, the limit valve LV4 is closed and unblocking the jet 183 temporarily removes pressure from the pilot point RV8A allowing the relay flow path RV8" to close. The closure of the limit valve LV4 and the relay flow path RV9" pressurizes the pilot point RV1B and resets the relay flow path RV1' to the open position and the relay flow path RV1" to the closed position. When the relay flow path RV1" is closed, pressure is supplied to the pilot point H1 and the cylinder 126 along with the mass 116 and the upper punch assembly 115 are moved into the dwell position to start a new cycle.

The jet 191 in conjunction with the pilot point RV9A is supplied to insure that the apparatus does not operate without a sufficient charge of powder in the opening 98. When the upper punch assembly 115 moves into the precompression position, if the opening 98 contains a sufficient amount of powder, a closure member 195 is maintained over the end of the jet 191 (see FIG. 18) but if the opening 98 does not contain a sufficient amount of powder, the upper punch assembly 115 moves downwardly a sufficient distance so that the closure member 195 opens the jet 191, which causes the pilot point RV9A to be depressurized. Depressurizing the pilot point RV9A closes the relay flow path RV9" and pressurizes the pilot point RV6B which opens the relay flow path RV6'. When the relay flow path RV6' opens, pressure is removed from the input of the time delay relay valve TRV1 preventing the operation thereof. Simultaneously, the depressurization of the pilot point RV9A opens the relay flow path RV9' so that pressure cannot be supplied to the pilot point P5 to operate the gun valve 50.

At some time after the pilot point P5 is pressurized, the time delay TD3 allows the pilot point RV4A to be pressurized, which causes the relay flow paths RV4' and RV4" to be closed and opened, respectively. Opening the relay flow path RV4" removes pressure from the pilot point P5 and returns the gun valve 50 to the normal position, which connects the inner opening of the gun valve housing 45 to the vacuum in the chamber 32 and causes the projectile 31 to return to the normal position in the gun valve 50. Closure of the relay flow path RV4' pressurizes the pilot point RV6B returning the relay flow path RV6' to the open position and preparing the circuitry for the next cycle. As a product passes through the chute 181 and causes the jet 183 to be unblocked, the pilot point RV8A is depressurized. Depressurizing pilot point RV8A returns the relay flow path RV8" to the normally closed position which pressurizes RV1B and returns the relay flow paths RV1' and RV1" to the normal position. Pilot point RV5B was pressurized when limit valve LV2 closed so the relay flow path RV5' returned to the normal position at that time. Assuming the pushbutton valves PB2 and PB3 are still closed, a second cycle will begin immediately.

When a powder material which is nonconducting, such as a refractory, or the like, is introduced into the powder preprocessing device 130, it is more difficult to start an arc between the electrodes 133 to heat the material. Therefore, if a non-conducting material is to be utilized, the relay flow path RV11", the pilot point P6, the time delay TD2 and the pilot point RV11A are inserted in the circuit, as illustrated in dotted lines in FIG. 21. Thus, when the pilot point P3 is pressurized to supply hydrogen gas to the conduit 141, the pilot point P6 is pressurized also. Both of the valves 144 and 145 are illustrated in FIG. 24 and operate in a similar fashion. When the pilot point P6 is pressurized, a conducting media, such as water vapor or the like, is supplied to the venturi tube 143, which causes the water vapor to mix with the hydrogen in the conduit 141. The time delay TD2 is set so that only a small amount of water vapor is supplied with the hydrogen gas after which the pilot point RV11A is pressurized and the relay flow path RV11" opens to depressurize the pilot point P6. The small amount of water vapor and hydrogen in the powder preprocessing device 130 greatly shortens the path between the electrodes 133 to initiate an arc therebetween. Once an arc is initiated between electrodes 133, the hydrogen gas therebetween is ionized and the arc is sustained until the pilot point P3 is depressurized and the hydrogen between the electrodes 133 is removed. It should be understood that a sufficient voltage may be applied between the electrodes 133 to initiate an arc, whether the powdered material is conducting or nonconducting, if desired and the arc may be quenched by removing the voltage from the electrodes 133. Thus, the present apparatus can be utilized to preheat conducting or nonconducting powdered material and form it into parts having any desired configuration.

I claim:
1. Apparatus for converting powdered material into parts having a desired configuration including:
 (a) die means having first and second portions;
 (b) means mounting said die means movably between a first position for receiving a charge of powdered material therein and a second position for forming said charge into the desired configuration;
 (c) impact producing means directed against said first portion of said die means for moving said die means into said second position; and
 (d) restraining means cooperating with said second portion of said die means for absorbing the unused energy of said impact producing means and preventing secondary shocks in the formed configuration after said die means has moved into said second position by allowing limited movement of said second portion away from said first portion of said die means.

2. Apparatus for converting powdered material into parts having a desired configuration as set forth in claim 1 having in addition means for preprocessing the powdered material mounted in communication with the mounting means to introduce the powdered material into the die means in the first position.

3. Apparatus for converting powdered material into parts having a desired configuration as set forth in claim 2 wherein the preprocessing means includes means for preheating the powdered material so that portions of substantially each grain of powder are approximately at the melting point and the remainder of each grain is relatively cool upon introduction into the die means.

4. Apparatus for converting powdered material into parts having a desired configuration as set forth in claim 1 having in addition means for producing a partial vacuum within said die means prior to placing the charge of powdered material therein and maintaining said partial vacuum therein during movement of said die means into the second position thereof.

5. Apparatus for converting powdered material into parts having a desired configuration as set forth in claim 1 wherein the restraining means include a piece having a relatively large mass fixedly attached to the second portion for movement therewith away from the first portion after the impact producing means has moved the die means into the second position.

6. Apparatus for converting powdered material into parts having a desired configuration as set forth in claim 5 wherein the piece having a relatively large mass is in communication with a chamber containing fluid under a variable pressure for providing a variable amount of restraint on the movement of the piece.

7. Apparatus for converting powdered material into parts having a desired configuration as set forth in claim 1 having in addition means for ejecting the part from the die means as the second portion moves away from the first portion after the die means has been moved into the second position by the impact producing means.

8. Apparatus for converting powdered material into parts as set forth in claim 1 having in addition means for providing a magnetic field through the powdered material at least during movement of said first portion of said die means into said second position.

9. Apparatus for converting powdered material into parts having a desired configuration and wherein the particles of powdered material are joined by fused interfaces therebetween comprising:
   (a) die means having first and second portions;
   (b) means mounting said die means movably between a first position for receiving a charge of powdered material therein and a second position for forming the charge into the desired configuration and fusing the interfaces between powder particles;
   (c) means mounted externally of the die means for heating a charge of powder so that portions of each grain of powder are approximately at the melting point and the remainder of each grain is relatively cool;
   (d) means communicating with said heating means and with said mounting means for introducing charges of heated powder into said die means in the first position;
   (e) impact producing means directed against said first portion of said die means for moving said die means into said second position;
   (f) means for impelling said impact producing means against said first portion of said die means with sufficient force to cause the portions of the grains of powder to liquify and form fused interfaces between adjacent grains; and
   (g) restraining means cooperating with said second portion of said die means for absorbing the unused energy of said impact producing means and substantially preventing secondary shocks in the formed configuration after said die means has moved into said second position by allowing limited movement of said second portion away from said first portion of said die means.

10. Apparatus as set forth in claim 9 wherein the means for heating a charge of powder includes means for removing substantial amounts of undesirable impurities from the charge of powder during heating.

References Cited

UNITED STATES PATENTS

| | | | |
|---|---|---|---|
| 2,448,277 | 8/1948 | Renier | 18—16M |
| 2,562,876 | 8/1951 | Balga | 18—16.5 |
| 2,694,922 | 11/1954 | Vilella | 18 |
| 2,717,225 | 9/1955 | Williams | 18—16MUX |
| 2,821,748 | 2/1958 | Willi | 18—16.7 |
| 2,999,271 | 9/1961 | Falk et al. | 18—16.5X |
| 3,052,919 | 9/1962 | Rayburn | 18—16F |
| 3,129,463 | 4/1964 | Gill et al. | 18—16.5X |
| 3,132,379 | 5/1964 | Crane | 18—16.5 |
| 3,154,812 | 11/1964 | Haller | 18—16.7 |
| 3,156,011 | 11/1964 | Olson | 18—16M |
| 3,191,232 | 6/1965 | Haller | 18—16.7 |
| 3,274,303 | 9/1966 | Muller | 18—16.7X |
| 3,416,191 | 12/1968 | Richter et al. | 18—16.5 |

J. HOWARD FLINT, JR., Primary Examiner

U.S. Cl. X.R.

18—16.5; 29—182; 75—211, 214; 264—82, 111